United States Patent
Durst, Jr. et al.

(10) Patent No.: US 6,434,561 B1
(45) Date of Patent: *Aug. 13, 2002

(54) METHOD AND SYSTEM FOR ACCESSING ELECTRONIC RESOURCES VIA MACHINE-READABLE DATA ON INTELLIGENT DOCUMENTS

(75) Inventors: Robert T. Durst, Jr.; Kevin D. Hunter, both of Fort Myers, FL (US)

(73) Assignee: Neomedia Technologies, Inc., Fort Myers, FL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/075,238

(22) Filed: May 9, 1998

Related U.S. Application Data

(63) Continuation-in-part of application No. 09/023,918, filed on Feb. 13, 1998, and a continuation-in-part of application No. 08/967,383, filed on Nov. 8, 1997, now Pat. No. 5,933,829
(60) Provisional application No. 60/046,037, filed on May 9, 1997.

(51) Int. Cl.[7] .............................................. G06F 17/30
(52) U.S. Cl. ................................. 707/10; 707/9; 707/1; 707/6; 707/2
(58) Field of Search ........................... 235/375; 380/20, 380/25, 49, 54, 4, 9; 707/10, 9, 1, 2, 6; 382/75, 317

(56) References Cited

U.S. PATENT DOCUMENTS

| | | | |
|---|---|---|---|
| 5,247,575 A | * | 9/1993 | Sprague et al. ................. 380/9 |
| 5,355,411 A | | 10/1994 | MacDonald .................. 380/23 |
| 5,369,702 A | | 11/1994 | Shanton .......................... 380/4 |
| 5,426,779 A | | 6/1995 | Chambers, IV ................ 707/6 |
| 5,467,087 A | | 11/1995 | Chu ............................. 341/51 |
| 5,486,686 A | * | 1/1996 | Zdybel, Jr. et al. .......... 235/375 |

(List continued on next page.)

OTHER PUBLICATIONS

Robert Franceschini & Amar Mukherjee, "Data Compression Using Encrypted Text", IEEE, 1996, pp. 130–138.*

Primary Examiner—Paul R. Lintz
Assistant Examiner—Thuy Pardo
(74) Attorney, Agent, or Firm—Anthony R. Barkume

(57) ABSTRACT

A method of accessing electronic resources via machine readable data embedded on a document which comprises compressing input data with a transmitter adapted to save a first bandwidth using a compression method adapted to minimize utilization of bandwidth by the compressed input data while retaining substantially all information content of the input data and appending a compression flag to the compressed input data indicative of the compression method enabling a receiver to decompress the compressed input data. The compression step further comprises utilizing a compression dictionary adapted to map the elements and strings of the input data to minimized representations having redundancies deleted. The compression dictionary may be appended to the compressed input data (as cleartext or cyphertext) under circumstances where a bandwidth occupied by the appended compression dictionary is less than the bandwidth saved by the step of compressing the input data. The compression dictionary may also be selected by the receiver independently from the transmitter independently indexes, pointer registration, application restricted subsets or customized according to the input data content. Also the input data may be encrypted, and an encryption flag appended which is indicative of the encryption method enabling decryption via public or private key cryptosystems as well as utilizing various authentication techniques such as digital signatures to ensure that the document was created by a licensed user.

31 Claims, 10 Drawing Sheets

U.S. PATENT DOCUMENTS

| | | | |
|---|---|---|---|
| 5,506,697 A | | 4/1996 | Li et al. .................... 358/448 |
| 5,606,609 A | | 2/1997 | Houser et al. ................ 380/4 |
| 5,621,794 A | * | 4/1997 | Matsuda et al. ............. 380/20 |
| 5,671,282 A | * | 9/1997 | Wolff et al. .................. 380/25 |
| 5,748,809 A | * | 5/1998 | Hirsch ........................ 382/317 |
| 5,778,102 A | * | 7/1998 | Sandford, II et al. ....... 382/251 |
| 5,781,901 A | * | 7/1998 | Kuzma ........................ 707/10 |
| 5,822,436 A | * | 10/1998 | Rhoads ........................ 380/54 |
| 5,872,849 A | * | 2/1999 | Sudia .......................... 380/49 |
| 5,913,542 A | * | 6/1999 | Belucci et al. ................ 283/75 |
| 5,915,018 A | * | 6/1999 | Aucsmith ...................... 380/4 |
| 6,012,102 A | * | 1/2000 | Shacher ........................ 710/5 |
| 6,122,403 A | * | 9/2000 | Rhoads ........................ 382/233 |

\* cited by examiner

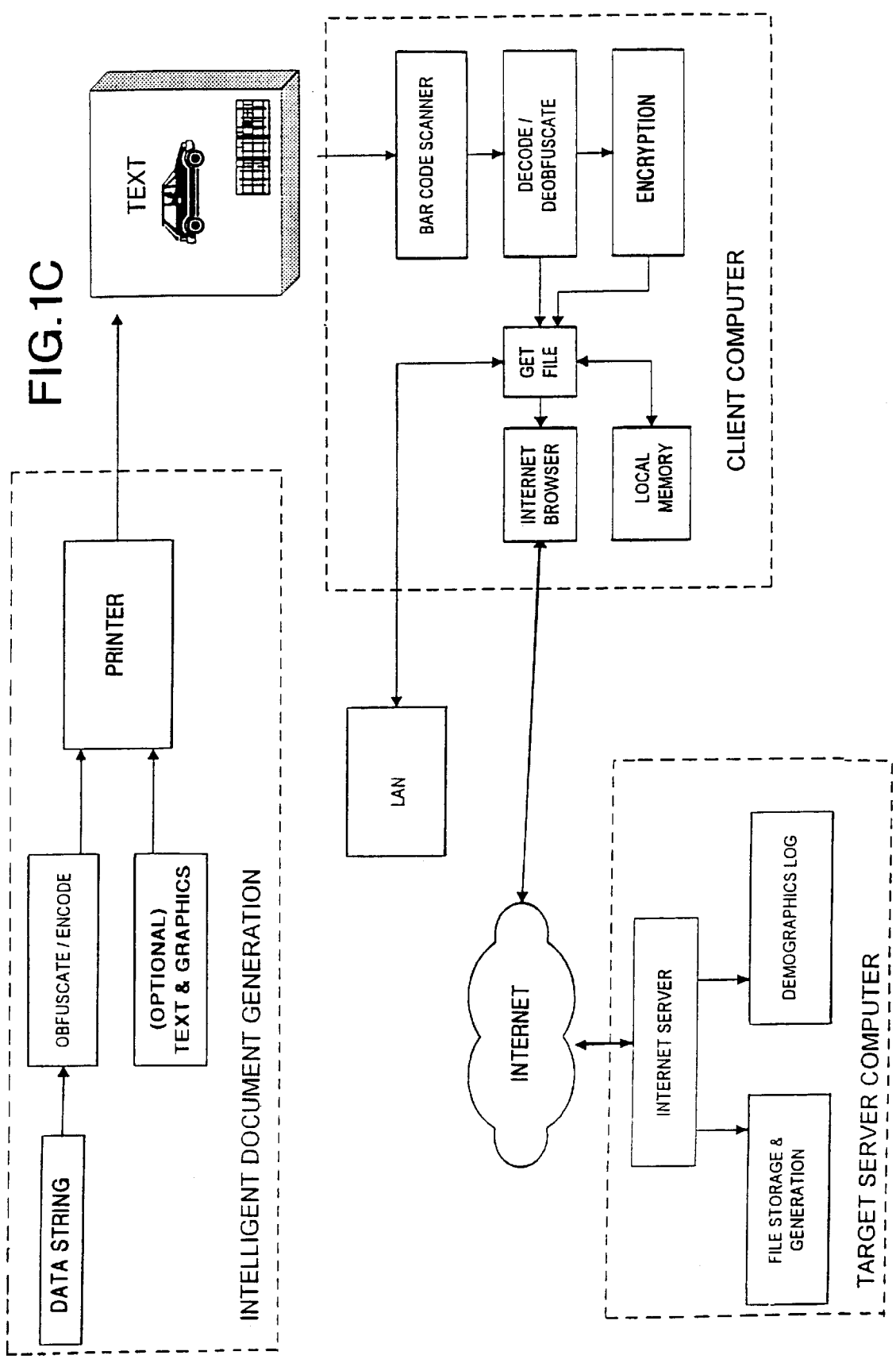

TO: jsm@hpfcla

SUBJECT: FAX BARCODES, CODE 411

FROM: kb@hpfcla

METHOD AND SYSTEM FOR ACCESSING ELECTRONIC RESOURCES VIA MACHINE-READABLE DATA ON INTELLIGENT DOCUMENTS

CROSS-REFERENCE TO RELATED APPLICATIONS

This application is a continuation-in-part application of U.S. application Ser. No. 08/967,383, filed Nov. 8, 1997 now U.S. Pat. No. 5,933,829; and is a continuation-in-part application of co-pending U.S. application Ser. No. 09/023,918 now pending, filed on Feb. 13, 1998; and claims priority of co-pending U.S. provisional application serial No. 60/046,037, filed on May 9, 1997; all of which are assigned to the assignee of the present application and incorporated by reference herein.

BACKGROUND OF THE INVENTION

The present invention relates to a secure and efficient method and system for embedding machine-readable and executable data in a printed document and linking them to networked computer resources.

Electronic documents including files, documents, data stores, executable files and the like are increasingly important in business and personal computing applications. Notwithstanding the widespread use of such electronic files, the use of printed media, in particular printed documents, remains essential for various reasons. In particular, printed documents have been shown to be more easily and efficiently read and comprehended, are generally cheaper to generate and distribute, and are desired in many industries and professions over prime electronic documents since tampering is more likely to be noticed than with electronic documents.

Electronic documents and printed media both enjoy advantages in certain situations, and may coexist and be used interchangeably depending on the application. The recent use of dense two-dimensional bar codes such as PDF417 has allowed the encoding of electronic data in a bar code symbol and the printing of such bar code symbol on a document. This technology is in its infancy and it is desired to implement secure, efficient methods of transferring data in electronic form on a printed document, referred to herein as an intelligent document. This enables the linking of electronic files with print media.

In addition to enabling the printing and distribution of electronic documents embedded in printed media, it is desired to enable a user to be given access to networked resources through such machine-readable symbologies. That is, in addition to providing a complete electronic file as an intelligent document, it is desired to be able to grant access to a targeted user to files found on an external resource, such as a computer network such as the Internet. That is, although a user is able in theory to enter a URL (uniform resource locator) into a browser program to obtain the Internet-based resource, such data entry on a keyboard is less than desirable.

However, human readable printed source addresses, and especially URL's, are particularly difficult to manually enter in software programs, such as web browsers, due to their length and use of complex and unfamiliar symbols. If the characters in an address are not entered exactly, retrieval is prevented or, in a limited number of cases, a legal but incorrect source is accessed. This is especially true when URLs incorporate foreign languages and/or complex query instructions to on-line databases, as is increasingly frequent in many web sites. In addition, the inability to type or otherwise manually enter symbolic address information due to either a disability or lack of training complicates use of on-line information resources such as the Internet and World Wide Web for millions of individuals.

Thus it would be highly desirable to develop a method which automatically links particular sections of printed matter appearing on documents to on-line resources, whereby a user could, with a minimum of effort or experience, access on-line resources located at a variety of URL'S. This concept is not limited to on-line resources, but is equally applicable to accessing a variety of electronic resources within the user's immediate network as well.

It is widely anticipated that Internet and World Wide Web access will increasingly be provided through interactive cable television via web-ready televisions and set-top conversion units used in conjunction with conventional television receivers. In this home entertainment environment, it would be difficult to use keyboards for address entry due to both lack of typing skill and the cumbersome placement of these data entry components. Moreover, many so-called WebTVs do not utilize a standard keyboard, but only allow primitive keyed input via a crude remote control device.

Thus, a method which would eliminate typing and allow users to directly link printed addresses and query scripts to electronic information sources would be highly desirable.

In many instances the providers of on-line resources would find it necessary, for both commercial and security reasons, to restrict access to only those users who are authorized through a variety of licensing schemes. Many authorization techniques are in existence such as those disclosed by U.S. Pat. No. 5,388,158, hereby incorporated by reference, however, none have been incorporated in a method which provides access to on-line and local resources via printed matter.

Thus it would be advantageous to provide access authentication of potential users prior to granting access to on-line resources as well as local resources in order to guarantee that only authorized users could obtain access to restricted information and that the document was in fact created by a licensed source.

It would also be advantageous for such a system to incorporate a level of encryption, whereby confidential information could be transmitted by means of publicly accessible telephony circuits. For example, commercial users wishing to utilize laptop computers equipped with modems operating over public telephone lines at hotels, press centers, exhibitions, fairs and the like realize the risk of disclosing sensitive information to competitors and would appreciate the added feature of encrypted transmissions in order to provide greater security against misappropriation.

SUMMARY OF THE INVENTION

In accord with the present invention a method of accessing electronic resources via machine readable data embedded on a document is provided which comprises compressing input data with a transmitter adapted to save a first bandwidth using a compression method adapted to minimize utilization of bandwidth by the compressed input data while retaining substantially all information content of the input data and appending a compression flag to the compressed input data indicative of the compression method enabling a receiver to decompress the compressed input data. The compression step further comprises utilizing a compression dictionary adapted to map the elements and strings of the input data to minimized representations having redundancies deleted. The compression dictionary may be appended to the compressed input data (as cleartext or cyphertext) under circumstances where a bandwidth occupied by the appended compression dictionary is less than the bandwidth saved by the step of compressing the input data. The compression dictionary may also be selected by the receiver independently from the transmitter independently indexes, pointer registration, application restricted subsets or customized according to the input data content. Also the input data may be encrypted, and an encryption flag appended which is indicative of the encryption method enabling decryption via public or private key cryptosystems as well as utilizing various authentication techniques such as digital signatures to ensure that the document was created by a licensed user.

BRIEF DESCRIPTION OF THE DRAWINGS

FIG. 1C illustrates an application of the present invention that encodes network resource pointers in an intelligent document.

DETAILED DESCRIPTION OF THE INVENTION

Figure 1A:
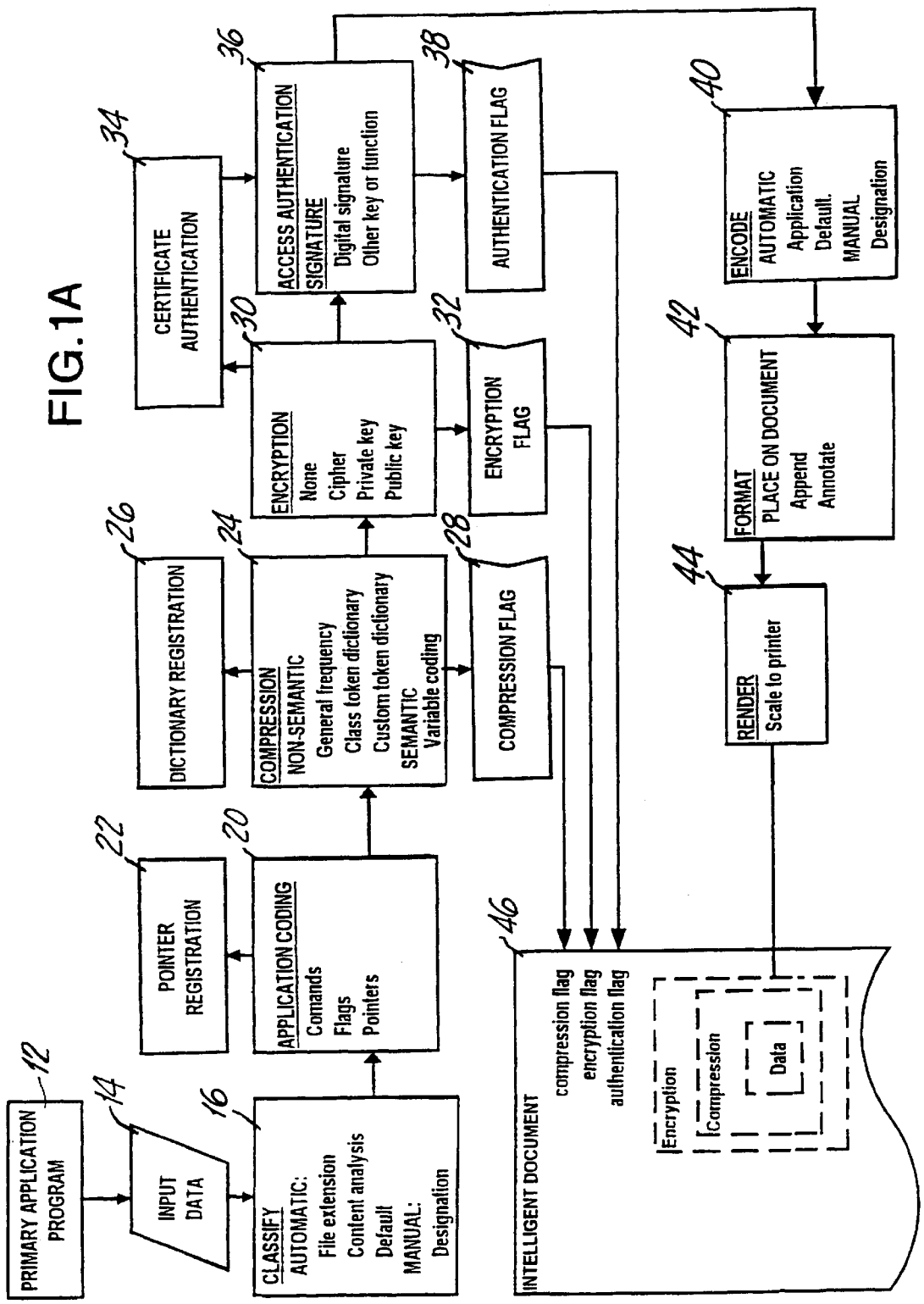
FIG. 1A is a block diagram which illustrates a method for embedding machine-readable data comprising electronic resources on an intelligent document of the present invention.
Figure 1B:
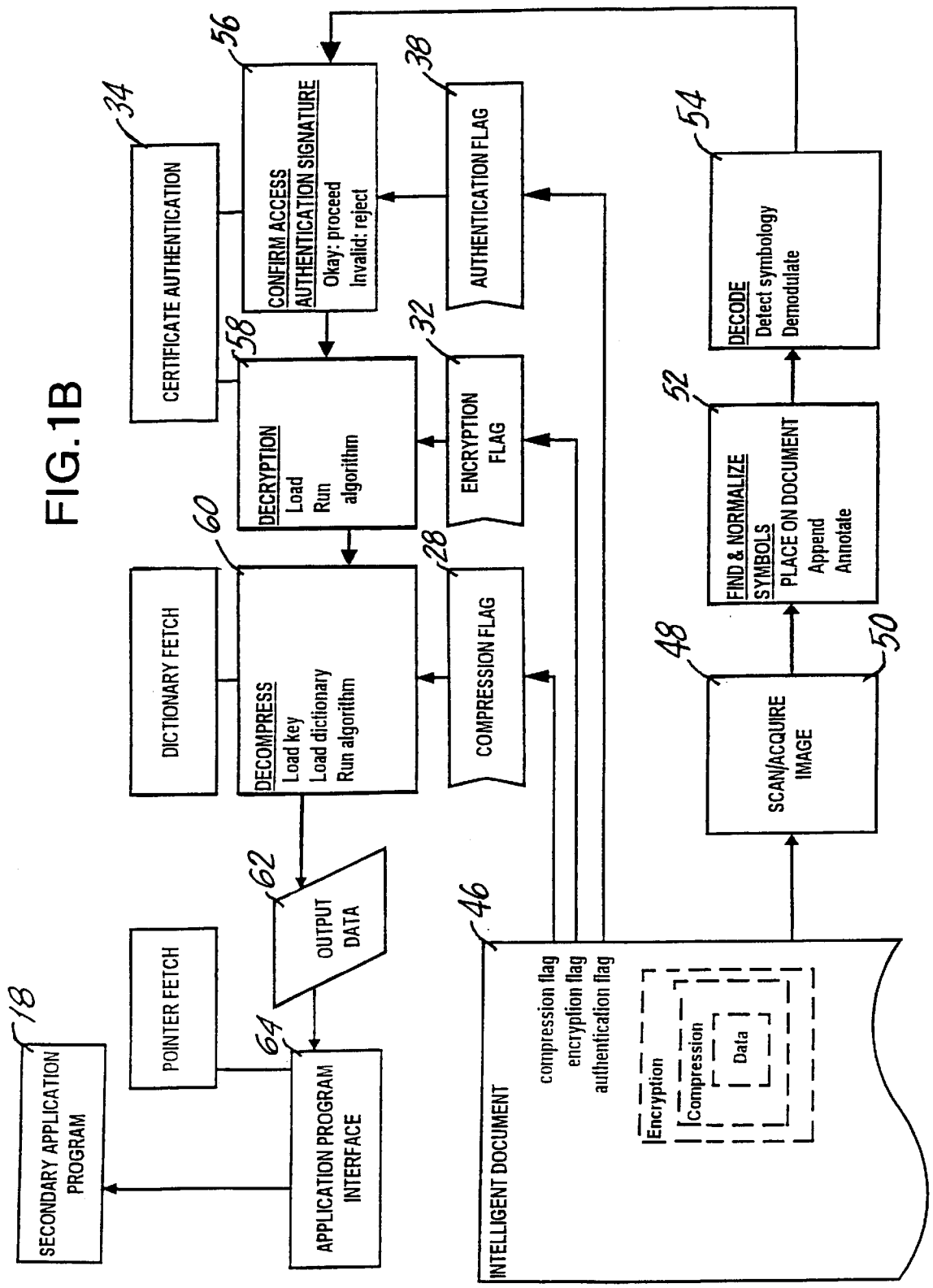
FIG. 1B is a block diagram which illustrates a method for recovering the electronic resources from the machine-readable data from the intelligent document of the present invention.

FIGS. 1A and 1B illustrate a block diagram of the method and system for encoding, rendering, distributing, recovering and accessing electronic resources via embedded machine-readable data on an intelligent document 46. The process of the present invention is initiated by a user, an automated source, or a primary application program 12 with input data 14 consisting of data files, executable programs, pointers to stored information or other digital data having information content stored on a computer system or transmitted on a digital data network.

A data classification step id first performed by the system. By properly classifying the data to be encoded, the recipient of the intelligent document 46 can scan the machine readable symbol rendered thereon and the application associated with the transferred data file will be automatically invoked. Thus the input data 14 is applied to a classification step 16 which sorts and tags the input data 14 according to the corresponding primary application program 12 which was either used to generate the input data 14 or is most closely associated with it. This can be done automatically with software by reading and analyzing file extensions of the input data 14 which are then mapped to common application programs 12 by convention. For instance, a file with a .doc extension would be mapped to a Microsoft Word® application. As a result, the recipient's computer will automatically execute Microsoft Word® upon processing the intelligent document 46. The classification step 16 could also be accomplished by analyzing the actual content of the input data 14 and identifying the specific or class of primary application programs 12 with which the input data 14 would most likely be associated with. Techniques which analyze the content or syntax of the input data 14 by searching for either specific deterministic markers such as the presence of 'getchar' for C source code, or heuristic signatures such as the frequency of { }. Alternatively, the classification step 16 could be performed manually via operator designation upon initialization of the system as well as in real time during operation.

Once the associated primary application program 12 is identified, the input data 14 can be supplemented with prefixes, suffixes, labels or commands which are effective to communicate with subsequent secondary application 18 programs in an application coding step 20. For example, a URL=command could be prefixed to a string known to identify a web page (URL=http://www.neom.com) in order to signal software in the subsequent secondary application program 18 to invoke a web browser and link to that site. The application coding step 20 could also be used to provide pointer registration 22 to a local or distributed retrieval address of the file being referenced. This would provide a means for automatically creating and listing indexes for on-line retrieval of information through the use of machine-readable codes.

The use of a machine-readable symbol to embed a reference (i.e. pointer) to a resource, such as a URL that points to a file on a host server computer on the Internet, has great value in this intelligent document application. Although there are great advantages in transmitting a self-contained, static data file by this invention, this does not allow for the variation of the data to be distributed to recipients once the intelligent documents are printed and distributed. However, by including only a resource pointer in the intelligent document, the location pointed to by the intelligent document remains constant but the data itself (i.e. the contents of the file) may change in accordance with the needs of the data content provider. That is, by embedding an Internet URL, the content provider knows that users of a particular intelligent document will always be directed to that location on the Internet, and can change the data file returned by that URL as he desires.

In addition or in the alternative to a URL, an index may be encoded within the intelligent document that may be sent by the user's browser program to a lookup table or index database located on a networked resource such as the Internet. A URL correlated to the index would be returned to the user's browser, and the browser would then use the URL to retrieve the resource from the appropriate server computer. This provides even greater flexibility since the URL may change in the future, and the content provider need only change the mapping function in the lookup table so that the same index is mapped to and returns a different URL. Thus, by including pointers such as indexes and/or URLs, great flexibility is provided by the intelligent document system where needed. Co-pending U.S. patent application Ser. Nos. 08/967,383 and 09/023,918 teach particular applications of indexes and resource addresses embedded in machine-readable symbols, and are incorporated by reference herein. FIG. 1C is illustrative of the overall system that retrieves a networked resource from a URL embedded in a machine-readable symbol embedded in an intelligent document, which may be implemented advantageously in the intelligent document system of the present invention as further described herein.

After the data to be encoded is determined, an optional compression step is implemented so that large data files can be encoded, even if the size of the file is too large to fit within the machine-readable symbology being employed. That is, during the compression step 24 the input data 14 is compressed to reduce the amount of bandwidth required to represent and convey the information without unreasonable distortion in the information content. This can be accomplished using compression methods which reduce the amount of redundant information in a transmission by optimally coding data elements or strings of data elements (i.e. tokens). In order to use these tokens to restore the original message during decoding, a compression dictionary can be transmitted with the input data 14, in which case a minimal acceptable compression value is defined as that point where the overhead of sending the compression dictionary with the data 14 is less than the bandwidth saved using compression. In the alternative to transmitting the compression dictionary inband, the compression dictionary may reside on an accessible data source (i.e., known and available to the recipient) and correctly mapped to the compressed data during decompression. Since the application programs associated with the input data 14 are known from the classification step 16 an appropriate compression method and associated compression dictionary can be defined and made available to both the compression 24 and decompression 60 steps based upon general message classification (e.g. letter frequency in English for plaintext English messages) or application restricted subsets (e.g. optimized compression for multi-token strings such as http:// for messages classified as html files).

Figure 2:
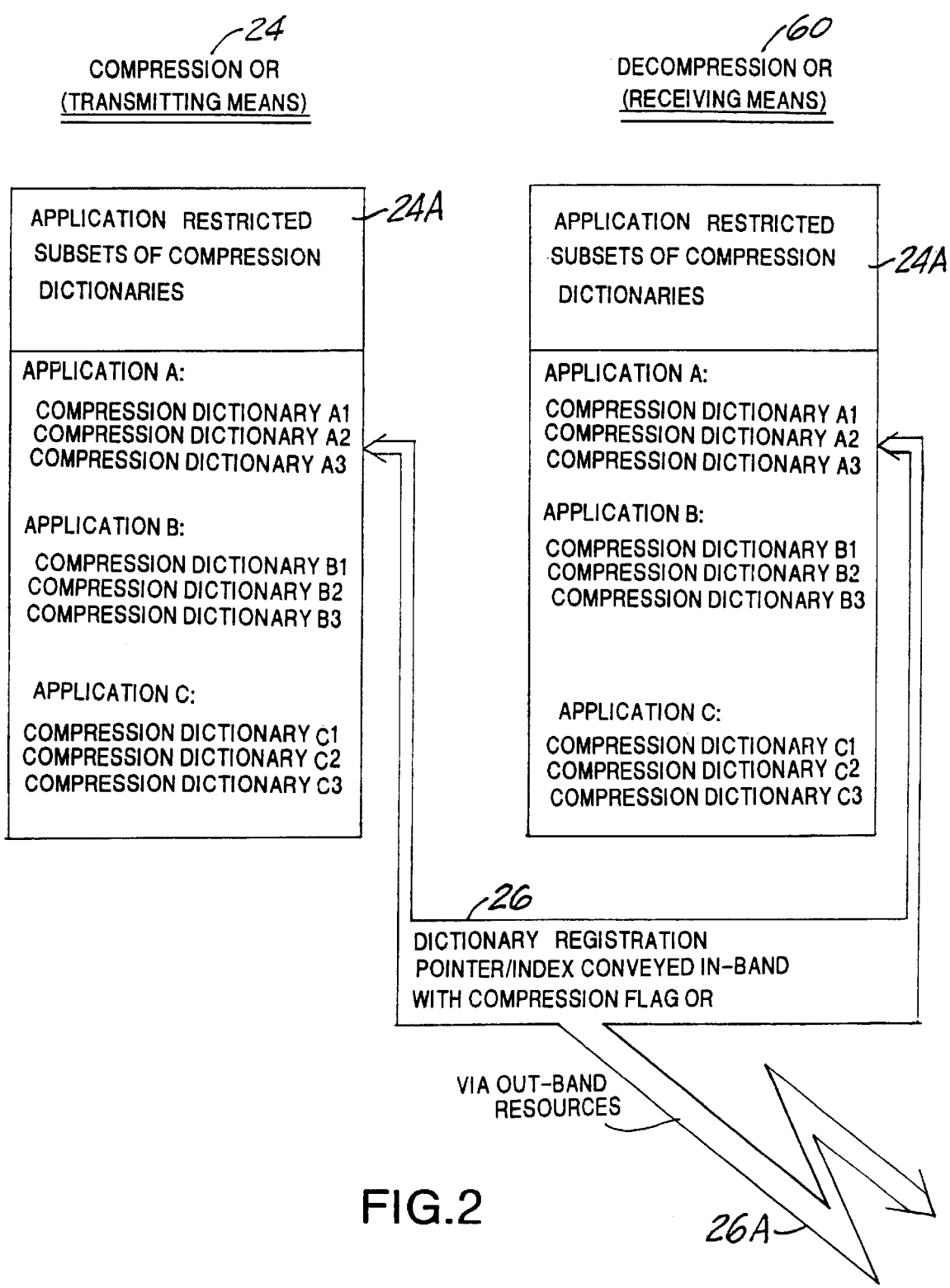
FIG. 2 is a block diagram which illustrates the use of application restricted subsets of compression dictionaries and a method of dictionary registration of the present invention.

FIG. 2 illustrates use of application restricted subsets of compression dictionaries 24A. During the compression step 24 a transmitting means has access to a number of subsets of compression dictionaries grouped according to application programs which are most closely associated with potential input data 14. Based upon the application associated with the input data 14 as determined in the classification step 16 of FIG. 1A a pointer or index is directed to a compression dictionary within a subset defined by the corresponding application program. The value of the pointer or index is transferred via in-band 26 or out-band 26A resources to a decompression step 60 on FIG. 1B which then uses the pointer or index to determine the appropriate method for the decompression step 60. This method of dictionary registration between the transmitting and receiving means enables the transfer of compressed input data without the explicit transmission of the compression dictionary utilized.

For optimal compression, custom compression dictionaries can be generated for specific input data 14 and either transmitted in-band or posted by transmitting processes and retrieved by receiving processes from out-band sources using an agreed upon indexing or dictionary registration 26 scheme conveyed in either the syntax of compression flags or through pointer registration 22. In circumstances where custom compression is implemented during the compression step 24 a totally secure cipher in the form of a one-time pad may be implemented within the custom compression technique.

Figure 3:
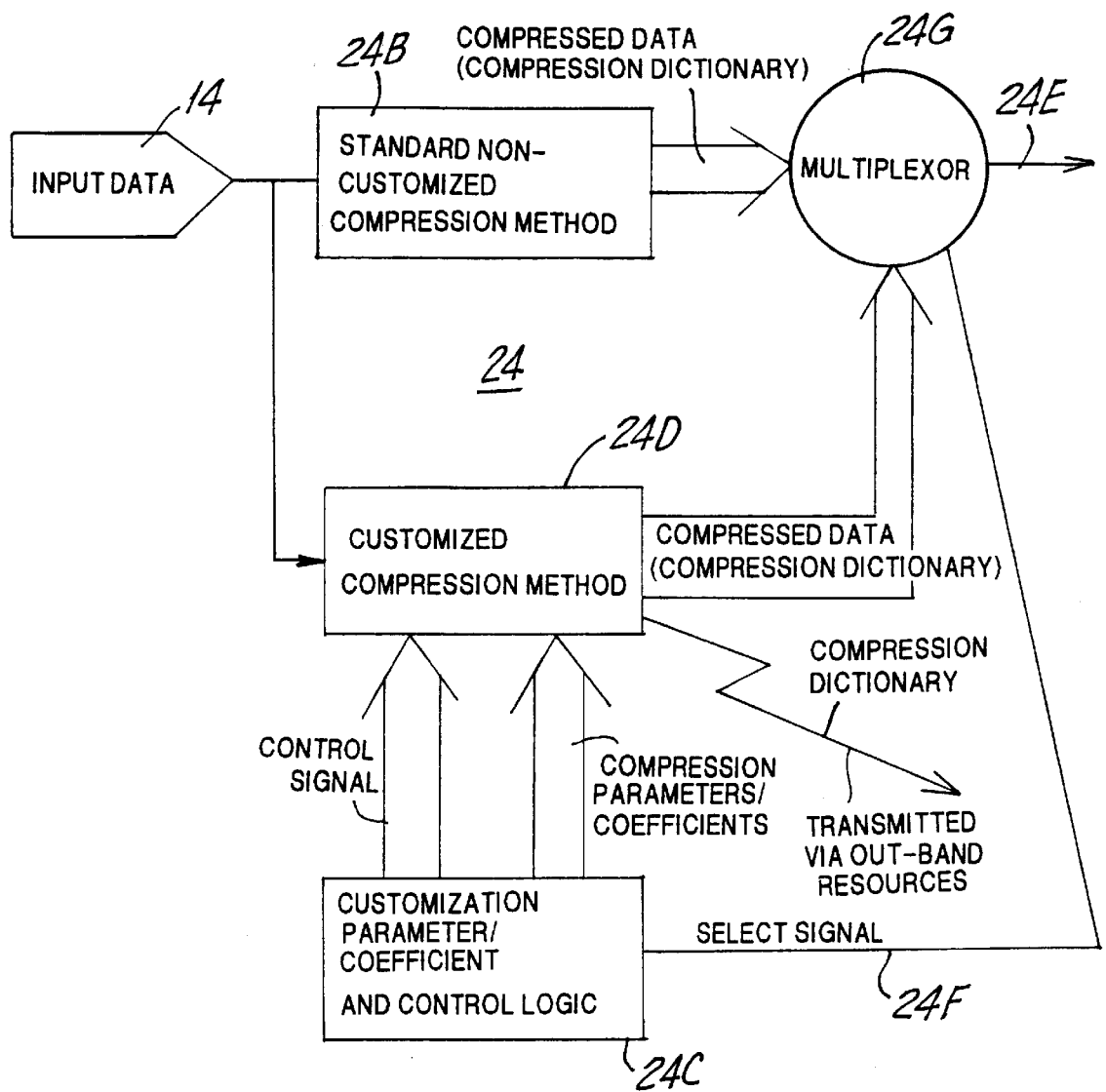
FIG. 3 is a block diagram which illustrates a method of applying customized compression dictionaries of the present invention.

FIG. 3 illustrates an embodiment for application of customized compression dictionaries. The input data 14 is initially applied to a standard non-customized compression method 24B in order for a customization parameter/coefficient and control logic block 24C to obtain a predetermined sample of the content of the input data 14 in order to analyze it and determine the optimal compression algorithm, coefficients and parameters to apply according to methods well known in the art. After a sufficient sampling time has elapsed the customization parameter/coefficient and control logic block 24C may then direct the output 24E of the compression method to be derived from the customized compression method 24D by applying the appropriate select signal 24F to the multiplexor 24G. Due to the closed loop structure of this method dynamic variations in algorithm, coefficients, and parameters may continue to be provided to the customized compression method 24D during operation in order to maintain optimal performance of the overall compression step 24. Using the method described the compression dictionary may be transferred either in-band with the compressed data, via out-band resources, or not at all.

In addition to token compression, semantic-based variable coding compression may be utilized, whereby raw text information is analyzed and represented symbolically, transmitted in-band and then expanded at the receiving end using a set of common mapping conventions. An example of this technique would be a file where eye color is encoded as a simple numeric or bit pattern value (e.g. 1=blue or 00000001=blue). Another example would be the substitution of large numbers of boilerplate application parameters in an application data file with a symbolically coded value which indicates the application and the specific configuration in use in a native file. This could then be expanded through substitution during the decompression step 60, thereby saving an appreciable amount of bandwidth. A compression flag 28 is appended to indicate which compression method was used and thus which method to be used during the decompression step 60.

In general data compression is a process of finding the most efficient representation of an information source in order to minimize communication bandwidth or storage requirements. Often compression consists of two stages ※ the first is the choice of a probabilistic model for the source and the second is the design of an efficient coding system for the model.

Any of a variety of cipher or encryption methods can optionally be used during an encryption step 30. The appropriate encryption method is selected during configuration or interactively by the operator and identified using an encryption flag 32 which is transmitted with the encrypted input data 14. Certificate authentication 34 for public key encryption generation and authorization may also be used.

Such a method employing encryption is disclosed in U.S. Pat. No. 5,243,655, which is hereby incorporated by reference. In the aforementioned patent one embodiment of the invention encodes and decodes the data using a keyed data encryption technique in order to increase the security of the data transmission. In this embodiment, only the person having the encryption key would be able to decode the pattern. Encryption is the process of converting some information from an easily understandable format into what appears to be a random sequence. If the encryption method is effective, only the intended readers of the information will be able to convert it back to its original and intelligible format. This inversion is called decryption. Prior to encryption the information is termed plaintext and after encryption it is termed ciphertext.

The processes of encryption and decryption, also known as encipherment and decipherment, can be expressed as a number of steps involving well-defined rules, decisions and calculations. Stated simply, they are algorithms. The steps may be many or few, and the mathematics simple or complex. Because they are inverse operations, the steps used to encrypt and decrypt are usually different. Companion encryption and decryption algorithms are jointly called a cryptosystem.

Figure 4:
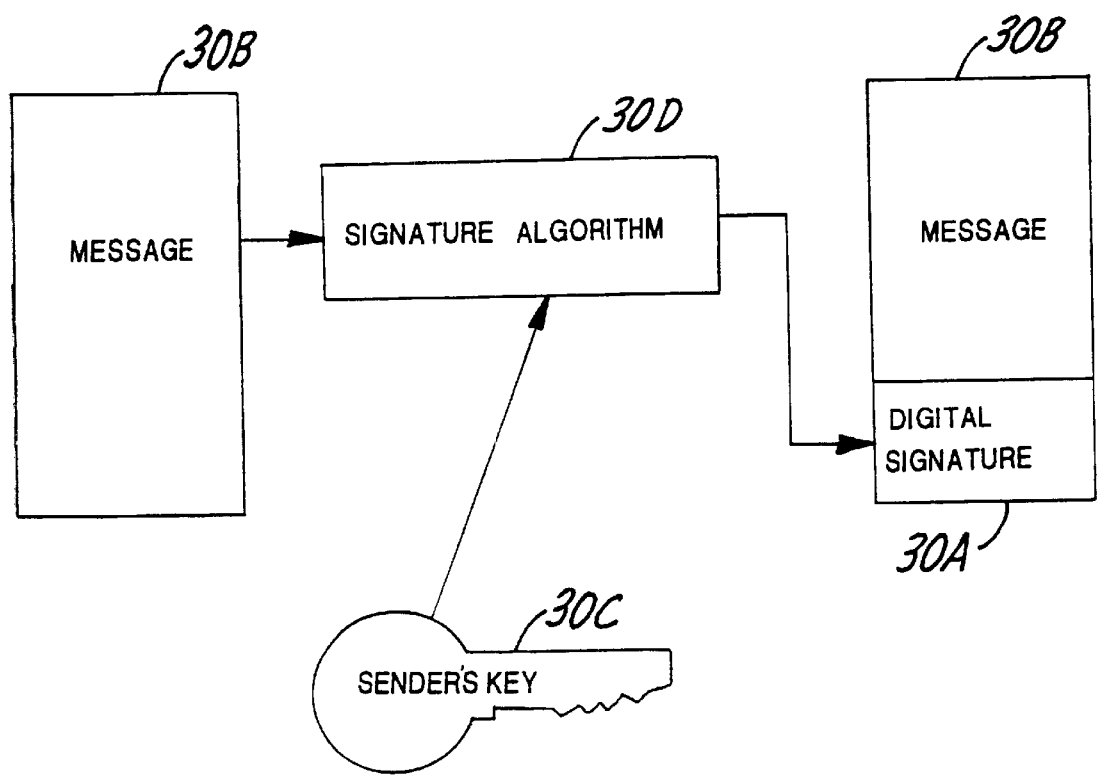
FIG. 4 is a block diagram which illustrates the use of digital signatures.

Some cryptosystems employ the use of digital signatures 30A of the prior art, as illustrated in FIG. 4, which function to identify the creator or sender of the message. Digital signatures 30A are to electronic transmission of information what handwritten signatures are to printed correspondence except that they are virtually impossible to forge. This is due to the fact that each digital signature 30A is unique to the message 30B it signs since the message 30B itself as well as the sender's key 30C are used in creating the digital signature 30A within the signature algorithm 30D. An additional advantage of using digital signatures 30A is the verification of message integrity since a digitally signed message which has been altered will fail the recipient's signature verification. For example, the signature algorithm 30D could perform a one-way hashing function on the contents of the message 30B and then encrypt the result with the sender's key 30C. One example of a hashing function is a checksum which comprises an appropriate number of bits with respect to the length of a typical message such that it becomes unreasonable to expect that the message could be altered while retaining the same result of the hashing function.

Figure 5A:
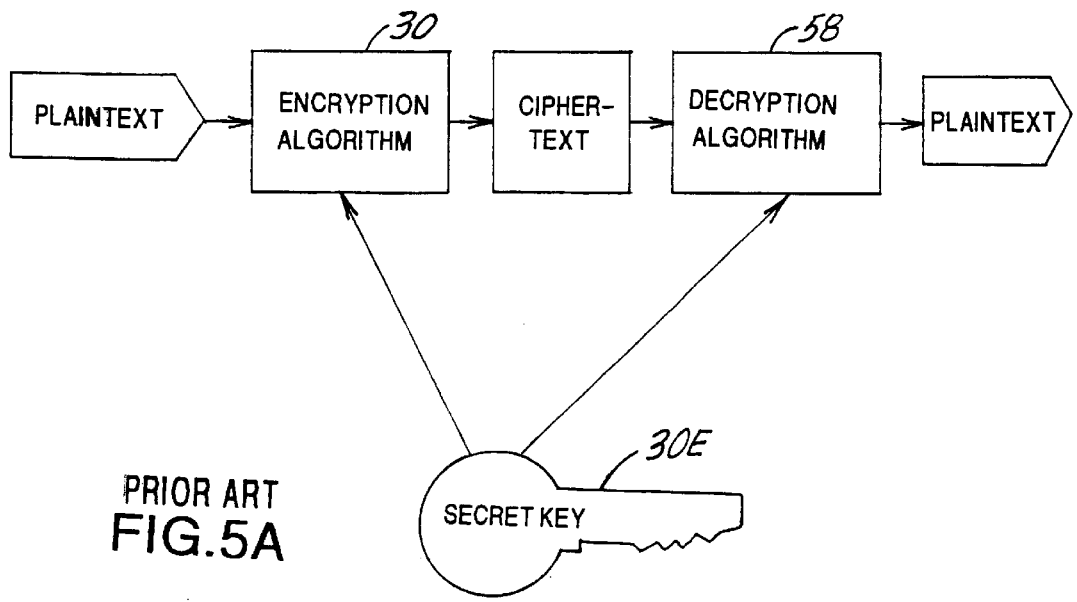
FIG. 5A is a block diagram which illustrates the operation of a secret key cryptosystem.
Figure 5B:
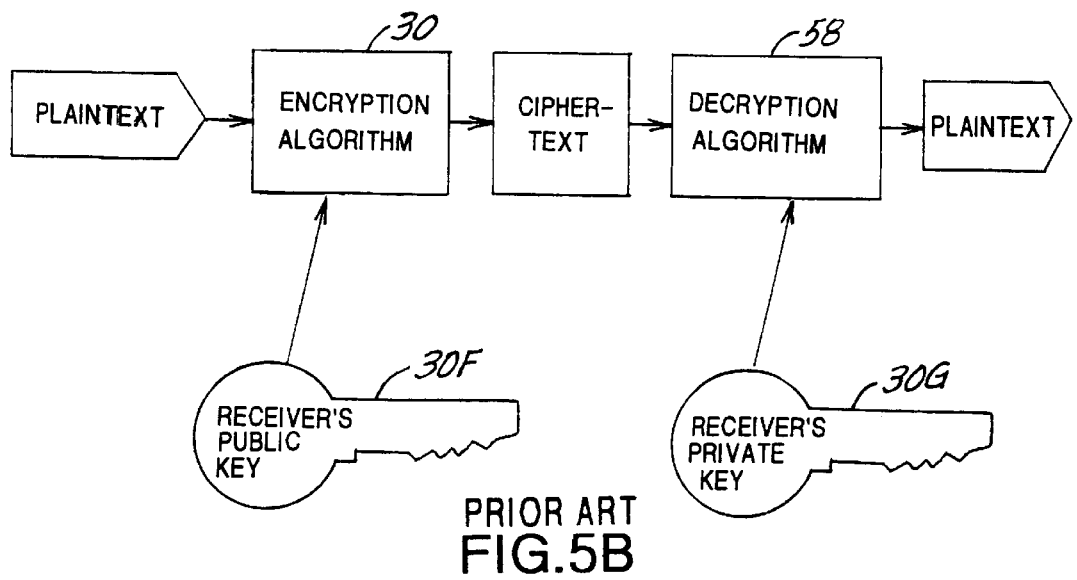
FIG. 5B is a block diagram which illustrates the operation of a public key cryptosystem

Two fundamentally different types of key-based cryptosystems are typically used. They are called secret-key cryptosystems as illustrated in FIG. 5A, and public-key cryptosystems as illustrated in FIG. 5B. The term secret key 30E indicates that the security of a ciphertext message lies largely in the ability of the sender and receiver to keep the key a secret. With secret-key systems, a secret key 30E is used for both the encryption step 30 and the decryption step 58. For this reason, they are also called symmetric cryptosystems or symmetric ciphers. Conversely, public key cryptosystems, as illustrated in FIG. 5B, always use different encryption and decryption keys, with the required characteristic that one cannot realistically be derived from the other. This means that the encryption key may be disclosed to the general public which is termed the public key 30F. Messages encrypted with the public key 30F can only be decrypted by the holder of the decryption key, which is called the private key 30G. The reverse is also true in some forms of public key cryptography. Since the keys are different, and knowledge of the public key 30F does not generally reveal the private key 30G (although one could in theory determine the private key given substantial computer power; i.e it is simply impracticle to derive the private key from the public key), public-key cryptosystems are known as asymmetric cryptosystems or asymmetric ciphers. The discussion above appears in greater detail and refinement in Hughes, *Internet Security Techniques* (1995), which is hereby incorporated by reference.

In addition to cipher and encryption methods, which are used to secure the contents of the input data, the present invention may also use a digital signature or similar authentication technique in an authentication step 36 to ensure that only licensed sources generate the document. Among other features, this will permit free dissemination of decoding software, since the decoding software can only be used with documents originating from licensed users. Data pertinent to the authentication step 36 is included in the message in the form of an authentication flag 38 (e.g. digital signature). Access to a certificate authentication 34 is also provided as shown in FIG. 1 to be used as required according to the method chosen for authentication.

Digital signatures may be used to certify authenticity as well as to ensure the veracity of message (i.e. that is has not been tampered with).

Authentication primarily establishes proof of the identity of a potential user. Usually this involves one or a combination of something the user is, something the user knows or something the user has. Friends, family, and acquaintances commonly identify someone by something they are (e.g., physical characteristics). Bank automated teller machines identify someone as a potential customer by something they have (e.g., an authorized ATM card) in combination with something they know (e.g., their Personal Identification Number (PIN)). Techniques which measure biological characteristics or physical phenomena including fingerprint and handprint analysis, retinal scans and voice and handwriting recognition as well as alternative biometric techniques could be used to authenticate potential users. Some of the disadvantages of biometric techniques is that the implementation cost is relatively high, there is a tendency to make errors in judgment due to the required tolerances, and the concern of some users of the potential for spreading communicable diseases via contact. The assumption with biometrics is that the characteristics being measured cannot be borrowed, stolen, or found and are very difficult if not impossible to duplicate.

User to host authentication schemes identify users to computer systems. The purpose of this type of authentication is to provide users with services for which they are authorized, and to deny access to services for which they are not. Those services might include an interactive login session, networked access to the host's file system or access to electronic resources as in the present invention.

The most ubiquitous authentication scheme employed in computing systems is based on static passwords. A user chooses or is assigned an account name and an associated password. Given together these satisfy the host of the user's identity. The host need only have some way to confirm that a password entered by the user is correct.

Using a challenge-response scheme, it is possible for a host to verify that a user knows her password without requiring her to send it over the network. Assume that a host receives a login request from a user who responds by issuing a challenge string likely to be unique, perhaps including a timestamp and a process identification. The user's client software concatenates the password entered to the challenge string and computes a one-way hash of the result. This hash output is forwarded to the user who independently performs the same calculation. If the host's hash matches the user's hash then the password entered was correct.

The advantage of this scheme is that the user's password does not traverse the network, and is therefore not subject to eavesdropping and replay. The security of such a system depends largely on the host's ability to keep the password database secure. Although passwords might be stored in cleartext, a more secure approach requires the host to reversibly encrypt all the passwords in a master key, assuming that key could be kept secret.

The use of static passwords presents problems inherent to any password-based system as well as others which result indirectly from security weaknesses due to the application. With any static password based authentication mechanism selection of the password should be undertaken to provide immunity to guessing and dictionary attack. However, when a secure password is entered in cleartext over an unsecure channel, it is as subject to network eavesdropping as an unsecure password.

An alternative scheme that prevents such attacks is a one-time password system. Unlike authentication mechanisms based on static passwords, those based on one-time passwords are not at all endangered by cleartext password entry. Three popular one-time password mechanisms are Bellcore's S/KEY, handheld authenticators, and smart cards.

The idea behind Bellcore's S/KEY one-time password system was first conceived by Lamport in 1981 and later implemented in software on Unix systems. Its primary goal is to provide secure password-based authentication over unsecure networks. S/KEY achieves this by utilizing a user's secret password to algorithmically produce a sequence of passwords, each of which may be used exactly one time. As with standard Unix passwords, no one-time S/KEY passwords are stored in cleatext on the server system. Secret passwords always remain a secret to their owners, and unlike standard Unix passwords are never transmitted over the network except through carelessness. S/KEY is essentially a hash function that is easy to compute, but very difficult to invert. In other words, a one-time password p is easily calculated:

$$p=f(s)$$

where s, the secret key, is the input to the hash function f. Given p, however, it is unfeasible to determine s.

Handheld authenticators, also called handheld password generators or tokens, are small hardware devices that generate one-time passwords. Use of handheld authenticators is based on the premise that each one is uniquely associated with exactly one user in the host's authentication database.

The authenticators are about the size of a credit card or a calculator, with numbered keys and comprise a small LCD display. They contain dedicated integrated circuitry that calculates one-time passwords. Some also comprise internal clocks used in password derivation, however, this approach requires that the authenticator's clock be synchronized to the host system clock.

There are two major categories of handheld authenticators;

1. Asynchronous handheld authenticators involve the use of a challenge-response scheme wherein the host issues a challenge that the user keys into the authenticator. The response appears on the display which the user then enters and transfers to the host. The same concept may be used with an added requirement that the user enter a PIN.

2. Synchronous handheld authenticators provide a password which is based on its internal clock without the issuance of a challenge by the host. This method may also require the entry of a PIN prior to the challenge.

Each of these schemes require that both the authenticator and the host know a common algorithm which computes the one-time password. The algorithm may either be publicly known or proprietary according to the application. Methods which require a PIN effectively authenticate the user to the handheld authenticator and not to the host so that the possibility for eavesdropping is limited to non-network means. To protect against PIN guessing, the authenticators usually disable themselves after several consecutive incorrect PIN's are entered. When these types of authenticators are coupled with static passwords an extremely secure system results. Handheld authenticators must be relatively tamper proof in order to prevent modification and analysis. They are generally powered by batteries and relatively inexpensive in order to facilitate disposal and replacement.

Smart cards operate much the same as handheld authenticators, however, they comprise more complex circuitry such as a central processing unit (CPU), a clock, program read only memory (ROM), RAM, and nonvolatile RAM or electrically erasable program read only memory (EEPROM) which are used to store and retain the key during power shutdown. The smart card permits the use of long keys without user intervention beyond entry of the PIN. The smart card communicates directly with the challenging entity via a reader and with the user via parallel, serial or PCMCIA interfaces.

Figure 6A:
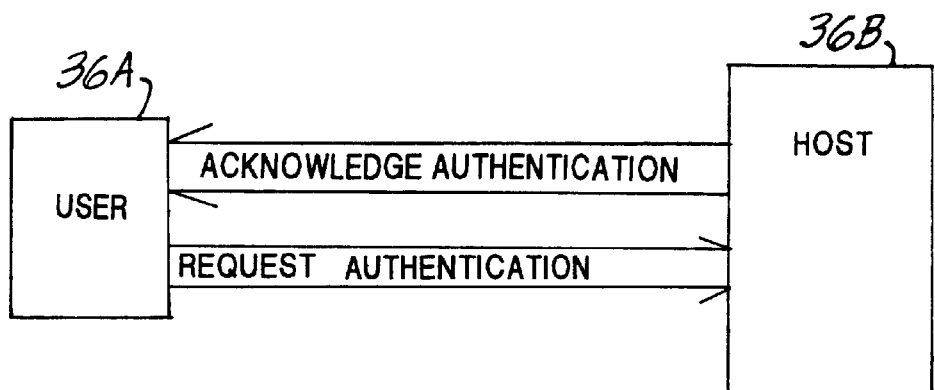
FIG. 6A is a block diagram which illustrates a two party trust authentication model.

Another method of authentication is through trusted third parties. In the general two party trust model, illustrated in FIG. 6A, a user's authenticity is judged by a host 36B based upon the user's credentials such as a password. Each party decides to trust the other. The user 36A must trust that the host 36B is the intended one and not an impostor in a position to accept his password and use it as an illegal entry into the system. In addition, the host 36B must trust that the user 36A is actually authorized and has not merely stolen the password.

Figure 6B:
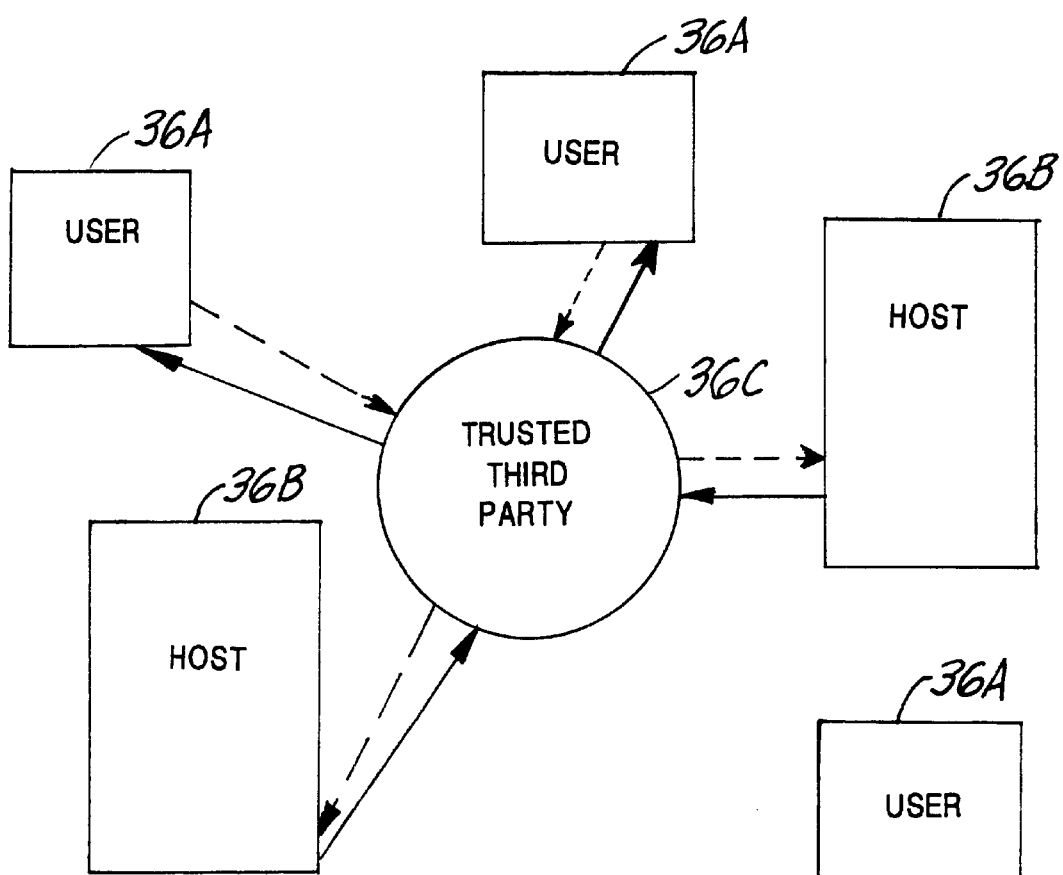
FIG. 6B is a block diagram which illustrates a trusted third party authentication model.

In a trusted third party configuration, as illustrated in FIG. 6B, the host 36B and user 36A each rely on the judgment of a trusted third party 36C or key distribution center (KDC) to ascertain the authenticity of each others identity. The KDC treats both the user 36A and host 36B as equal entities or principals. The trusted third party configuration represents an improvement over the two party configuration in that neither principal divulges a secret key to the other when attempting authentication.

Since the KDC is the only arbiter of authentication it must present a highly reliable and secure system since a breach of its security represents a problem to all principals which utilize its services. Also the KDC can become a bottleneck or result in total breakdown of communication links between any principal since all communications must pass through the KDC. Additional KDC's may be implemented, however, this presents further problems related to synchronization, maintenance and security. In addition, since all principals must place inherent trust in the KDC, this generally results in reducing the size of the environment. The Kerberos authentication system is an example of a trusted third party authentication method and is described in detail in Hughes, *Internet Security Techniques* pp. 91–125, (1995), which is hereby incorporated by reference. The authentication step 36 of the present invention could either be incorporated or operated in conjunction with any of the aforementioned methods of authentication (i.e., passwords, handheld authenticators, smart cards, and trusted third parties, or the equivalent method well known in the art).

Figure 7:
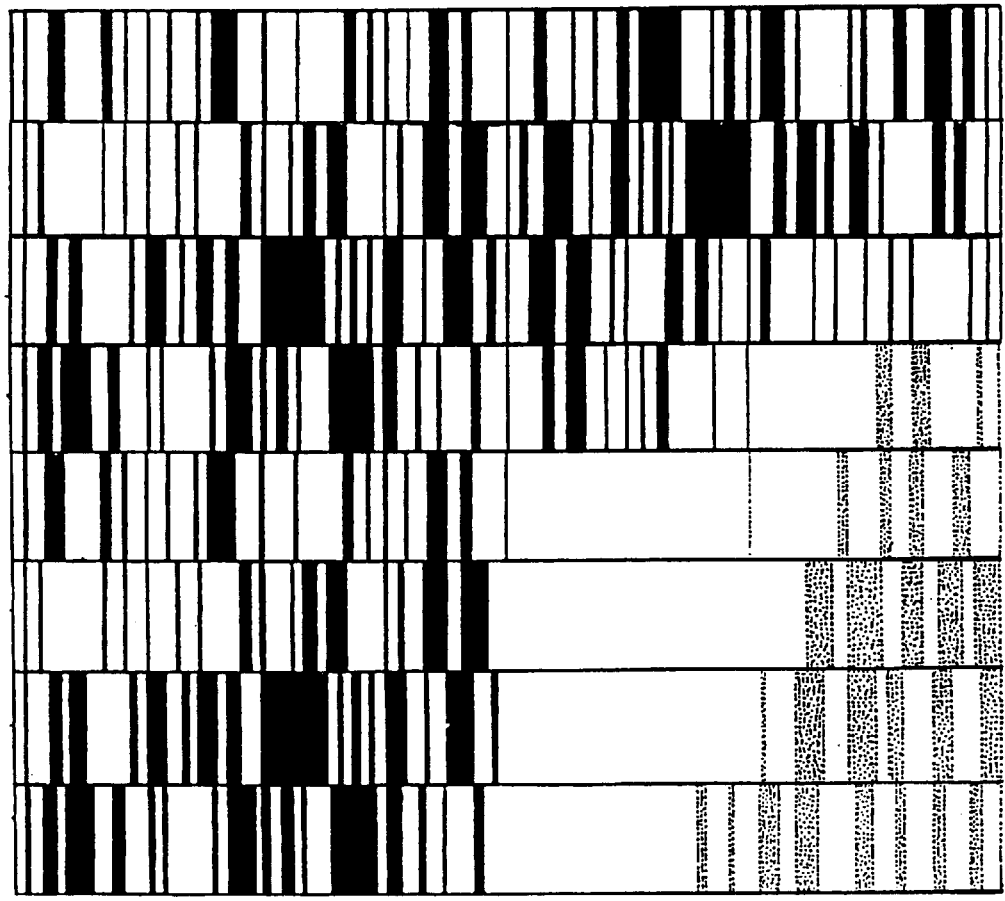
FIG. 7 illustrates an example of a two dimensional bar codes.
Figure 8:
FIG. 8 illustrates examples of linear bar codes.
Figure 8:
Figure 8:
Figure 8:
Figure 8:
Figure 8:
Figure 8:

An encoding step 40 converts the input data 14, including any application coding and flags as previously described, to instructions for generating printed machine-readable symbologies including all associated modulation/demodulation marks, structures, error detection and correction and packet synchronization, as defined for the chosen symbology. This pertains to both high capacity (e.g. two-dimensional bar codes) as shown in FIG. 7 and linear symbologies (e.g. conventional barcodes) as shown in FIG. 8 used as either pointers or a direct means of data transmission. Which symbology is selected for a given encoding method is determined by configuration parameters which may be general, pertain to a given application or environment, or user selectable. Symbologies are self-identifying and, therefore, require no symbology identification flag contrary to the compression 24, encryption 36, and authentication 36 steps.

One method of efficiently linking the printed document to outside resources is to encode the printed document using bar code symbology as described in detail in U.S. Pat. Nos. 5,243,655; 5,399,846; 5,504,322; and 5,471,533 which are hereby incorporated by reference. A bar code is typically a linear array of elements that are either printed directly on an object or on labels that are affixed to the object. Bar code elements typically comprise bars and spaces with bars of varying widths representing strings of binary ones and spaces of varying widths representing strings of binary zeros. Many bar codes are optically detectable and are read by devices such as scanning laser beams or handheld wands. Other bar codes are implemented in magnetic media. The readers and scanning systems electro-optically decode the symbol to multiple alpha-numerical characters that are intended to be descriptive of the article or some characteristic thereof. Such characters are typically represented in digital form as an input to a data processing system for a variety of applications.

U.S. Pat. No. 5,388,158, which is hereby incorporated by reference, discloses a method which secures a printed document against tampering or alteration. This invention contemplates the document in question being scanned to produce a digital signal which is compressed, encrypted, and coded as a two dimensional bar code or some other appropriate form of coding, which is then incorporated onto a label and affixed to the document. In one embodiment the signal representing the image is encrypted using a pubic key encryption system and the key is downloaded from a central location. This key maybe changed from time to time in order to increase security. To facilitate authentication the corresponding decryption key is encrypted with another key and incorporated on the card. To validate the document the encoded signal is scanned from the label decoded, decrypted, expanded and displayed. The card may then be authenticated by comparing the displayed representation of the image with the document.

Encoded symbology graphics must be configured and incorporated into the machine-readable documents according to aesthetic and functional considerations during a formatting step 42. In addition, even when aesthetics are not highly relevant, it is often desirable to place the symbologies in known positions so that they may easily be found and identified by automated processes prior to decoding. The placement of the symbology graphics is determined by configuration parameters, application settings and user selection. Options include appending all symbols as an appendix to the document, as notation on a page by page basis (e.g. the lower margin) or paragraph by paragraph basis, or as embedded elements in text and graphics which indicate associations with embedded, on-line, or other forms of electronic formation.

An intelligent document is prepared for distribution and display during a rendering step 44. This requires that the graphic symbology be represented so as not to distort the physical dimensions of each symbol due to insufficiencies in the rendering process since such distortions would hamper or prevent successful interpretation during a decoding step 54.

The completed intelligent document 46 contains graphically rendered machine readable symbols which contain compressed and optionally encrypted data representing the following:

(1) input data 14 in the form of
 (i) files, executable programs or macros,
 (ii) pointers to stored information, or
 (iii) a combination of these two;
(2) the compression flag 28 which indicates the method of compression and the compression dictionary used to compress the data as well as the optional pointer to the compression dictionary as indicated by the dictionary registration 26;
(3) the optional encryption flag 32 which indicates the method of encryption used and an optional pointer to the appropriate authentication certificate 34; and
(4) an authentication flag 38 which indicates that encoded data originated from an authorized licensed source, which may take the form of a digital signature with appropriate pointers to on-line certificate authentication 34 or other methods of authentication described in detail above.

If the intelligent document 46 is scanned with an imaging device in an acquire image step 48 the acquired image must be searched to find the symbols and corrected for orientation, skew, contrast and other distortions (e.g. warp) in a find and normalize symbols step 52 prior to decoding. However, if the document is encoded with symbology which can be scanned with a flying spot (e.g. laser scanner) in a scan image step 50 (e.g. PDF417) the find and normalize symbols step 52 is not required.

Machine readable symbology consists of highly structured patterns of light and dark areas contained in either a static image memory or conveyed as a series of edge transition patterns by a moving spot. During a decoding step 54, these patterns are analyzed and demodulated to reconstruct an error corrected data stream which is then further processed to extract application layer data. The decoding step 54 can be performed in software, hardware or a combination of the two and is often combined with the scan image step 50 or acquire image step 48 in physical devices such as laser or CCD scanners or high-speed imaging equipment. It can also be performed as a separate software process, particularly when acquisition is performed with image-processing equipment (e.g. document scanners).

The authentication flag 38 or signature is confirmed during an authentication step 56. This step may include confirmation that the certificate authentication 34 is still valid via access to an on-line Certificate Revocation Identification List (CRIL) or equivalent cache. If the authentication flag 38 is confirmed, processing of the decoded input data is permitted to proceed. If the authentication flag 38 is not confirmed, processing terminates with appropriate error conditions asserted to the user or application layer.

During a decryption step 58 the encryption flag 32 is analyzed to determine whether encryption has been performed on the decoded data and if so which decryption method to use. A decryption key is loaded and authenticated and a decryption algorithm indicated by the encryption flag 32 is performed which produces clear, compressed text for subsequent stages of processing. Access is optionally provided to on-line or cache verification including CRIL's.

During a decompression step 60, clear text produced by the decryption the step 58 is decompressed using the compression method and compression dictionary indicated by the compression flag 28. The compression dictionary may be universal, conveyed in-line as clear text, a cached application class dictionary (e.g. html) or fetched from an on-line source identified by the compression flag 28.

Upon completion of the decompression step 60, all information originally contained in the input data 14 is regenerated including data files, executable programs, macros, pointers and application coding as output data 62. The output data 62 is made available to an Application Programming Interface (API) 64 which invokes and feeds subsequent secondary application programs 18 which perform further program invocations and document display. For example, the command URL=http://www.neom.com would be interpreted by the subsequent secondary application program 18 which then invokes the designated web browser and links and executes the web page and Common Gateway Interface (CGI) script originally conveyed with the input data 14.

The CGI application gateway interface offered by httpd is a powerful tool that effectively converts Web browsers into multifaceted application clients. Almost any application that relies on form-based input from users can be adapted to CGI. To communicate with browsers, CGI programs on the server do little more than write HTML streams in standard output and parse formatted form input on the return trip. The ease or difficulty of everything else depends largely on the nature of the background application tasks. Programs written in Perl, a powerful C-like interpretive language, have become a favorite of CGI developers. Under the guidance of Web servers, browsers can provide HTML-based forms to users, which can be filled out and submitted back to the server for subsequent processing. This is best accomplished with the assistance of application gateways via CGI on the server system. For instance, a CGI program might transparently convert the user's form input into SQL and access a relational database in real-time.

Although the invention has been shown and described with respect to a best mode embodiment thereof, it should be understood by those skilled in the art that changes, omissions and additions in the form and detail thereof may be made therein without departing from the spirit and scope of the invention.

What is claimed is:

1. A method of accessing electronic resources via machine readable data on a document, comprising the steps of:

compressing input data with a transmitting means adapted to save a first bandwidth using a compression method adapted to minimize utilization of bandwidth by said compressed input data while retaining substantially all information content of input data; and appending a compression flag to said compressed input data indicative of said compression method thereby enabling a receiving means to decompress said compressed input data, wherein said step of compressing input data further comprises utilizing a compression dictionary adapted to map said elements and strings of said input data to minimized representations of said elements and strings comprising redundant elements and strings deleted.

2. The method of claim 1, wherein said step of utilizing a compression dictionary further comprises:

appending a compression dictionary to said compressed input data; and transferring said compression dictionary with said compressed input data under circumstances where a second bandwidth occupied by said appended compression dictionary is less than said first bandwidth saved by said step of compressing said input data.

3. The method of claim 2, wherein said compression dictionary is appended as cleartext.

4. The method of claim 2, wherein said compression dictionary is appended as cyphertext.

5. The method of claim 1, wherein said step of utilizing a compression dictionary further comprises selecting said compression dictionary by said receiving means and said transmitting means whereby said receiving means selects said compression dictionary independently from said transmitting means.

6. The method of claim 3, wherein said selection of said compression dictionary is dependent upon a classification of said input data according to applications associated with said input data.

7. The method of claim 1, wherein said step of utilizing a compression dictionary further comprises selecting a compression dictionary by said transmitting means and said receiving means according to applications associated with said input data from application restricted subsets of compression dictionaries.

8. The method of claim 1, wherein said step of utilizing a compression dictionary further comprises customizing said compression dictionary according to said input data content.

9. The method of claim 6, further comprising appending said customized compression dictionary to said compressed input data; and transferring said compression dictionary with said compressed input data.

10. The method of claim 6, further comprising transferring said customized compression dictionary separately from said compressed input data through out-band resources.

11. The method of claim 8, further comprising accessing said customized compression dictionary using an index conveyed with said compression flag.

12. The method of claim 8, further comprising accessing said customized compression dictionary using a pointer, registration of said pointer being directed by an application associated with said input data.

13. The method of claim 1, wherein said customized compression dictionary is adapted to encrypt said input data with a secure cypher.

14. The method of claim 1, wherein said compression dictionary is universally accessible to both said receiving means and said transmitting means.

15. The method of claim 1, wherein said compression dictionary is fetched from on-line resources.

16. The method of claim 1, wherein said compression dictionary is cached in resources local to both said receiving means and said transmitting means.

17. A method of accessing electronic resources via machine readable data on a document, comprising the steps of:

compressing input data with a transmitting means adapted to save a first bandwidth using a compression method adapted to minimize utilization of bandwidth by said compressed input data while retaining substantially all information content of input data; and appending a compression flag to said compressed input data indicative of said compression method thereby enabling a receiving means to decompress said compressed input data, wherein said step of compressing said input data further comprises token frequency compression of said elements and strings, whereby frequency of repetitive elements and strings is enumerated rather than copying said repetitive elements and strings in order to represent repetition.

18. A method of accessing electronic resources via machine readable data on a document, comprising the steps of:

compressing input data with a transmitting means adapted to save a first bandwidth using a compression method adapted to minimize utilization of bandwidth by said compressed input data while retaining substantially all information content of input data; and appending a compression flag to said compressed input data indicative of said compression method thereby enabling a receiving means to decompress said compressed input data, further comprising the steps of:

encrypting said input data using an encryption method; and appending an encryption flag indicative of said encryption method whereby said encrypted data may subsequently be decrypted, wherein said step of encrypting said input data further comprises a public-key cryptosystem, wherein said access authentication technique utilizes passwords to verify that said document was created by a licensed source, wherein said access authentication technique utilizes one-time passwords.

19. A method of creating a document capable of accessing electronic resources, comprising the steps of:

encoding a static file in a machine readable code;

encoding in the machine readable code a reference to an electronic resource in a computer network, wherein the electronic resource is capable of being modified without modification of the reference encoded in the code; and embedding said machine readable code in a machine readable symbol on a document, further comprising the steps of:

compressing said input data using a compression method adapted to minimize utilization of bandwidth by said compressed input data while retaining substantially all information content of input data so as to save a first bandwidth; and appending a compression flag to said compressed input data indicative of said compression method thereby enabling a receiving means to decompress said compressed input data.

20. The method of claim 19, further comprising the steps of:

utilizing a compression dictionary adapted to map elements and strings of said input data to minimized representations of said elements and strings whereby redundant elements and strings are deleted;

appending the compression dictionary to said compressed input data; and transferring said compression dictionary with said compressed input data under circumstances where a second bandwidth occupied by said appended compression dictionary is less than said first bandwidth saved by said step of compressing said input data.

21. The method of claim 20, further comprising the step of selecting said compression dictionary based upon a classification of said input data according to applications associated with said input data.

22. The method of claim 20, wherein said step of utilizing a compression dictionary further comprises selecting a compression dictionary according to applications associated with said input data from application restricted subsets of compression dictionaries.

23. The method of claim 20, wherein said step of utilizing a compression dictionary further comprises customizing said compression dictionary according to said input data content.

24. The method of claim 20, further comprising transferring said compression dictionary separately from said compressed input data through out-band resources.

25. The method of claim 20, wherein said compression dictionary is universally accessible to both said receiving means and said transmitting means.

26. The method of claim 18, wherein said step of compressing said input data further comprises token frequency compression of said elements and strings, whereby frequency of repetitive elements and strings is enumerated rather than copying said repetitive elements and strings in order to represent repetition.

27. A method of creating a document capable of accessing electronic resources, comprising the steps of:

encoding a static file in a machine readable code;

encoding in the machine readable code a reference to an electronic resource in a computer network, wherein the electronic resource is capable of being modified without modification of the reference encoded in the code; and embedding said machine readable code in a machine readable symbol on a document, further comprising the steps of:

encrypting said input data using an encryption method;

appending an encryption flag indicative of said encryption method whereby said encrypted data may subsequently be decrypted; and authenticating access to on-line resources via an access authentication technique adapted to ensure that said document was created by a licensed user, wherein said step of encrypting said input data further comprises a public-key cryptosystem, wherein said access authentication technique utilizes passwords to verify that said document was created by a licensed source, and wherein said access authentication technique utilizes one-time passwords.

28. A method of accessing electronic resources from a machine readable document, said method comprising the steps of:

scanning a machine readable code from a machine readable symbol on said machine readable document;

decoding a static file from said machine readable code;

decoding a reference to an electronic resource in a computer network from the machine readable code, wherein the electronic resource is capable of being modified without modification of the reference encoded in the code;

using the reference to an electronic resource to access an online electronic resource; and combining data obtained from said online electronic resource with the file decoded from said machine readable code, further comprising the steps of:

reading a compression flag included with said input data, said compression flag indicative of a compression method used to save a first bandwidth by minimizing utilization of bandwidth by said compressed input data while retaining substantially all information content of input data;

decompressing said input data according to a decompression method selected to match said compression method; and utilizing a compression dictionary adapted to map elements and strings of said input data from minimized representations of said elements and strings whereby redundant elements and strings are deleted.

29. A method of accessing electronic resources from a machine readable document, said method comprising the steps of:

scanning a machine readable code from a machine readable symbol on said machine readable document;

decoding a static file from said machine readable code;

decoding a reference to an electronic resource in a computer network from the machine readable code, wherein the electronic resource is capable of being modified without modification of the reference encoded in the code;

using the reference to an electronic resource to access an online electronic resource; and combining data obtained from said online electronic resource with the file decoded from said machine readable code, further comprising the steps of:

reading an encryption flag appended to said input data, said encryption flag indicative of an encryption method used to encrypt said input data;

decrypting said input data according to a method selected to reverse said encryption;

authenticating access to on-line resources via an access authentication technique adapted to ensure that said document was created by a licensed user, wherein said step of encrypting said input data further comprises a public-key cryptosystem, wherein said access authentication technique utilizes passwords to verify that said document was created by a licensed source, and wherein said access authentication technique utilizes one-time passwords.

30. A method of accessing electronic resources from an intelligent document, comprising the steps of:

encoding a static file in a machine readable code;

encoding a reference to an electronic resource in a computer network in the machine readable code, wherein the electronic resource is capable of being modified without modification of the reference encoded in the code;

embedding said machine readable code in a machine readable symbol on a document;

scanning said machine readable code from said machine readable symbol on said machine readable document;

decoding the static file from the machine readable code;

decoding the electronic resource reference from the machine readable code;

using the electronic resource reference to access an online electronic resource; and combining data obtained from said online electronic resource with the static file decoded from said machine readable code, further comprising the steps of:

compressing said input data using a compression method adapted to minimize utilization of bandwidth by said compressed input data while retaining substantially all information content of input data so as to save a first bandwidth;

appending a compression flag to said compressed input data indicative of said compression method thereby enabling a receiving means to decompress said compressed input data;

reading a compression flag included with said input data, said compression flag indicative of a compression method used to save a first bandwidth by minimizing utilization of bandwidth by said compressed input data while retaining substantially all information content of input data;

decompressing said input data according to a decompression method selected to match said compression method; and utilizing a compression dictionary adapted to map elements and strings of said input data from minimized representations of said elements and strings whereby redundant elements and strings are deleted.

31. A method of accessing electronic resources from an intelligent document, comprising the steps of:

encoding a static file in a machine readable code;

encoding a reference to an electronic resource in a computer network in the machine readable code, wherein the electronic resource is capable of being modified without modification of the reference encoded in the code;

embedding said machine readable code in a machine readable symbol on a document;

scanning said machine readable code from said machine readable symbol on said machine readable document;

decoding the static file from the machine readable code;

decoding the electronic resource reference from the machine readable code;

using the electronic resource reference to access an online electronic resource; and combining data obtained from said online electronic resource with the static file decoded from said machine readable code, further comprising the steps of:

encrypting said input data using an encryption method;

appending an encryption flag indicative of said encryption method whereby said encrypted data may subsequently be decrypted;

authenticating access to on-line resources via an access authentication technique adapted to ensure that said document was created by a licensed user;

reading an encryption flag appended to said input data, said encryption flag indicative of an encryption method used to encrypt said input data;

decrypting said input data according to a method selected to reverse said encryption; and authenticating access to on-line resources via an access authentication technique adapted to ensure that said document was created by a licensed user, wherein said steps of encrypting and decrypting said input data further comprise a public-key cryptosystem, wherein said access authentication technique utilizes passwords to verify that said document was created by a licensed source, and wherein said access authentication technique utilizes one-time passwords.

* * * * *